July 16, 1946.  J. D. KLINGER  2,404,295
BEARING
Filed Nov. 22, 1943
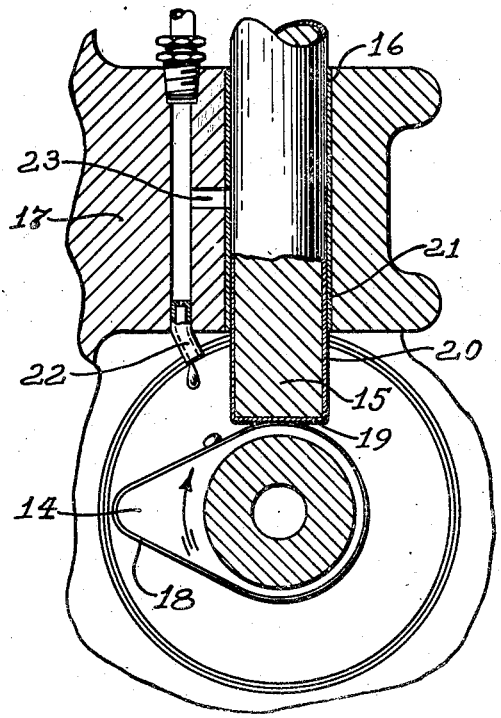
Fig. 2.
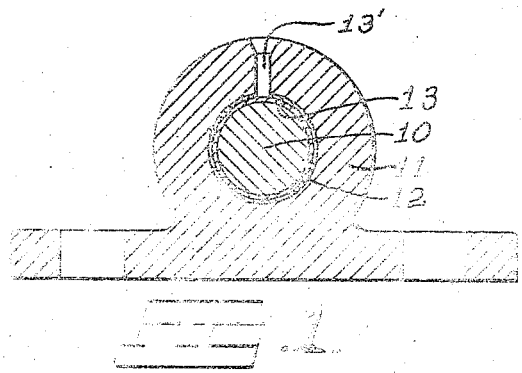
INVENTOR
JAMES D. KLINGER
BY Harness & Harris
ATTORNEYS Patented July 16, 1946

2,404,295

UNITED STATES PATENT OFFICE 2,404,295

BEARING

James D. Klinger, Detroit, Mich., assignor to Chrysler Corporation, Highland Park, Mich., a corporation of Delaware Application November 22, 1943, Serial No. 511,281

5 Claims. (Cl. 308—237)

This invention relates to improved bearing surface and the method of making the same.

More particularly, the invention pertains to improvements in surfaces of machine parts which operate under load in rubbing contact with each other in the presence of a lubricant.

Heretofore, lubricants containing sulphur or sulphur bearing compounds have been employed in many instances during both run-in and subsequent operations of machine parts of this kind in order to produce on the surfaces of the respective parts which operate in bearing-like or other rubbing contact with each other a film-like layer or deposition which is believed to comprise a sulphide of the metal, frequently ferrous, of which the parts consist. Sulphur containing lubricants are frequently used for this purpose during run-in operations of engines and other devices in which normal lubricants are subsequently used in order to build up bearing and rubbing contact surfaces which will become mated with each other more readily than the metal of which the parts are formed. In other devices such as gear transmissions, a sulphur bearing lubricant may be used for this purpose throughout the life of the mechanism without objectionable consequences.

One of the main objects of the invention is the provision of bearing surfaces having properties similar to those obtained by the use of sulphur containing lubricants which can be formed to a desired thickness on such parts prior to assembly thereof.

Another object of the invention is to provide bearing surfaces of this character which do not require replenishment during operation, by the action on the metal of the parts of lubricant contained agents.

A further object of the invention is to provide a bearing surface material which will withstand the normal run-in operations to which parts of this kind are frequently subjected and remain on the parts thereafter to serve in presenting well mated contacting surfaces during subsequent normal operation.

An illustrative embodiment of the invention is shown in the accompanying drawing in which:

Fig. 1 is a vertical sectional view of a shaft and bearing assembly illustrating an embodiment of the invention.

Fig. 2 is a side elevational view, partly in section, of a cam, follower and follower guide assembly illustrating other embodiments of the invention.

Rubbing contact surfaces embodying the invention which are particularly adapted to be readily mated with each other and which are further adapted to be well lubricated by conventional lubricants may be formed on parts which move relative to and in contact with each other by depositing a selenium coating thereon. The selenium coating may be produced as an immersion deposition or it may be electrolytically deposited. Thickness of the coating may be predetermined with respect to the construction, size and load carrying requirements of the parts. Only one of a pair of parts which operate in contact with each other may be coated or surfaces of both parts may be similarly coated with selenium. While this coating can be used to advantage and with an accompanying improvement of the lubrication of parts comprising numerous metals, it is particularly adapted for use on parts comprising ferrous metal.

A satisfactory selenium coating may be produced on parts comprising ferrous metal as well as on numerous metals lower in the electromotive series than selenium by immersing such parts in a bath comprising a solution of a selenium bearing compound. A suitable selenium coating bath may be produced by dissolving in 80 parts by weight of a 5% phosphoric acid solution, 20 parts by weight of selenium dioxide. The phosphoric acid solution may vary in concentration from substantially 2½% to 10%. It is understood that the final bath comprises an aqueous solution of selenious acid. Selenium coating baths may be made up of from 5 parts by weight of selenium dioxide and 95 parts by weight of the phosphoric acid solution, to substantially a saturated solution of selenium dioxide in such phosphoric acid solution. The selenium content may be introduced into the bath by the addition thereto of any soluble selenium salt such as salts of selenious acids, for example, sodium and potassium salts of selenious acid.

In Fig. 1 of the drawing is illustrated a shaft 10 journalled in a bearing 11, having a selenium deposit 12 on its bearing surface. The portion of the shaft 10 which is received in the bearing may also be provided with a deposit of selenium 13. A passage 13' is provided in the bearing 11 for supplying lubricant to the contacting surface of the shaft and bearing.

An assembly comprising a rotatable cam 14 and shiftable follower 15, embodying the invention, is illustrated in Fig. 2. The follower 15 is reciprocably mounted in a guide passage 16 formed in a support 17. A selenium deposit 18 is provided on the periphery of the cam 14 for contacting the end of the follower 15 which may also be provided with a selenium deposit 19. The periphery of the follower 15 as well as the wall of the passage 16 may be likewise coated with selenium deposits 20 and 21 respectively. Suitable lubricant, such as lubricating oil, may be supplied to the contacting selenium surfaces of the cam and follower by a tube 22 and to the contacting selenium surfaces of the support and follower through an oil passage 23 formed in the support. Only one of each of the contacting portions of various relatively moving parts shown in the drawing may be coated with a selenium deposit if desired, although longer bearing wearing life is believed to be obtainable when the contacting surfaces of both parts comprise selenium.

Although but several specific embodiments of the invention are herein shown and described, it will be understood that various changes in the sequence of operations, steps and materials employed may be made without departing from the spirit of the invention.

I claim:

1. An assembly including relatively movable metal parts having surface portions in rubbing contacting relation, and a coating on said surface portion of one of said parts adapted to mate readily with said surface portion of the other part during run-in operation of said assembly comprising a film-like layer having a metal content consisting substantially entirely of selenium and having bearing properties.

2. An assembly including relatively movable metal parts having portions in lubricated contacting rubbing relation, and a bearing layer having a metal content consisting substantially entirely of selenium on said portions of each of said parts, said bearing layers being adapted to readily mate with each other during run-in operation of said assembly.

3. An assembly including relatively movable ferrous metal parts having portions in lubricated contacting rubbing relation and a metal coating on said portion of one of said parts comprising an immersion deposition of selenium adapted to mate readily with said portion of said other part during run-in operation of said assembly.

4. A metal part having surface portion adapted for bearing-like rubbing contact with another part, and a bearing layer on said portion of said first mentioned part having a metal content consisting substantially entirely of selenium.

5. A ferrous metal part having a surface portion adapted for bearing-like rubbing contact with another part, and a bearing layer on said portion of said first mentioned part having a metal content consisting of an immersion deposition of selenium.

JAMES D. KLINGER.